(12) United States Patent
Panetta et al.

(10) Patent No.: US 11,919,135 B2
(45) Date of Patent: Mar. 5, 2024

(54) AUTOMATIC RAMP LOAD SENSE FOR POWER TOOLS

(71) Applicant: MILWAUKEE ELECTRIC TOOL CORPORATION, Brookfield, WI (US)

(72) Inventors: Michael J. Panetta, Wauwatosa, WI (US); Carter H. Ypma, Milwaukee, WI (US); Arik A. Miller, Shorewood, WI (US); Mitchell A. Ellena, West Allis, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 120 days.

(21) Appl. No.: 17/367,927

(22) Filed: Jul. 6, 2021

(65) Prior Publication Data

US 2022/0001525 A1 Jan. 6, 2022

Related U.S. Application Data

(60) Provisional application No. 63/118,183, filed on Nov. 25, 2020, provisional application No. 63/048,441, filed on Jul. 6, 2020.

(51) Int. Cl.
*B25F 5/00* (2006.01)
*B25F 3/00* (2006.01)
(Continued)

(52) U.S. Cl.
CPC ............... *B25F 5/001* (2013.01); *B25F 3/00* (2013.01); *H02P 1/04* (2013.01); *H02P 29/40* (2016.02)

(58) Field of Classification Search
CPC .............................. B25F 5/001; B25D 17/043
See application file for complete search history.

(56) References Cited

U.S. PATENT DOCUMENTS 4,006,387 A 2/1977 Hudak
4,574,226 A * 3/1986 Binder .................... B23B 45/02
318/434
(Continued)

FOREIGN PATENT DOCUMENTS

CN 105215953 A 1/2016
DE 3214482 C2 10/1988
(Continued)

OTHER PUBLICATIONS

International Search Report and Written Opinion for Application No. PCT/US2021/040449 dated Oct. 21, 2021 (13 pages).

*Primary Examiner* — Daniel Jeremy Leeds
(74) *Attorney, Agent, or Firm* — Michael Best & Friedrich LLP

(57) ABSTRACT

Power tools described herein include a tool output, a motor driving the tool output, a battery pack interface, a power switching network coupled between the battery pack interface and the motor, and a controller coupled to the power switching network to control operation of the motor. The controller is configured to operate the motor at a no-load speed at startup and detect a load state of the power tool. The load state indicates whether the power tool is in a loaded state or an unloaded state. The controller is also configured to incrementally ramp up a speed of the motor from the no-load speed to a selected speed when the power tool is in the loaded state and incrementally ramp down the speed of the motor from the selected speed to the no-load speed when the power tool is in the unloaded state.

20 Claims, 4 Drawing Sheets

(51) Int. Cl.
*H02P 1/04* (2006.01)
*H02P 29/40* (2016.01)

(56) References Cited

U.S. PATENT DOCUMENTS

| | | | |
|---|---|---|---|
| 5,357,179 A * | 10/1994 | Abbagnaro | B23B 45/02 |
| | | | 318/17 |
| 5,563,482 A | 10/1996 | Shaw et al. | |
| 6,236,177 B1 * | 5/2001 | Zick | B27B 5/38 |
| | | | 318/362 |
| 6,873,124 B2 | 3/2005 | Kawano et al. | |
| 7,334,648 B2 | 2/2008 | Arimura | |
| 7,882,899 B2 | 2/2011 | Borinato et al. | |
| 7,882,900 B2 | 2/2011 | Borinato et al. | |
| 8,302,701 B2 | 11/2012 | Morimura et al. | |
| 8,881,842 B2 | 11/2014 | Borinato et al. | |
| 9,073,186 B2 | 7/2015 | Kusakawa | |
| 9,160,261 B2 | 10/2015 | Nishikimi | |
| 9,162,331 B2 | 10/2015 | Tang | |
| 9,257,925 B2 | 2/2016 | Coates | |
| 9,314,855 B2 | 4/2016 | Ookubo et al. | |
| 9,543,871 B2 * | 1/2017 | Kato | H02P 7/2913 |
| 10,189,136 B2 * | 1/2019 | Coleman | B23Q 17/0952 |
| 10,483,884 B2 | 11/2019 | Wu | |
| 2011/0162861 A1 | 7/2011 | Borinato et al. | |
| 2013/0020102 A1 | 1/2013 | Björnlinger et al. | |
| 2013/0062086 A1 | 3/2013 | Ito et al. | |
| 2014/0352995 A1 | 12/2014 | Matsunaga et al. | |
| 2016/0151845 A1 | 6/2016 | Yamamoto et al. | |
| 2016/0193673 A1 | 7/2016 | Yoshida et al. | |
| 2017/0036337 A1 * | 2/2017 | Sawano | B25F 5/001 |
| 2017/0190032 A1 * | 7/2017 | Leong | B25F 5/00 |
| 2017/0216986 A1 * | 8/2017 | Dey, IV | B25F 5/00 |
| 2018/0099394 A1 * | 4/2018 | Ichikawa | B25D 17/043 |
| 2019/0030616 A1 * | 1/2019 | Hess | B23B 31/10 |
| 2019/0143469 A1 | 5/2019 | Coleman | |
| 2019/0232478 A1 | 8/2019 | Zawisza et al. | |
| 2020/0078897 A1 | 3/2020 | Ypma et al. | |

FOREIGN PATENT DOCUMENTS

| | | |
|---|---|---|
| DE | 102010001030 A1 | 7/2011 |
| JP | 2016135108 A | 7/2016 |
| WO | 2013140675 A1 | 9/2013 |
| WO | 2013161118 A1 | 10/2013 |
| WO | 2016034136 A1 | 3/2016 |

* cited by examiner

AUTOMATIC RAMP LOAD SENSE FOR POWER TOOLS

RELATED APPLICATIONS

This application claims the benefit of U.S. Provisional Patent Application No. 63/048,441, filed on Jul. 6, 2020 and U.S. Provisional Patent Application No. 63/118,183, filed on Nov. 25, 2020, the entire contents of which are hereby incorporated by reference.

FIELD

Embodiments described herein relate to automatically controlling the speed of a power tool to provide additional control over a tool operation and to prevent excess battery drain and excess heating of the power tool components.

SUMMARY

One embodiment provides a power tool including a tool output, a motor driving the tool output, a battery pack interface, a power switching network coupled between the battery pack interface and the motor, and a controller coupled to the power switching network to control operation of the motor. The controller is configured to operate the motor at a no-load speed at startup and detect a load state of the power tool. The load state indicates whether the power tool is in a loaded state or an unloaded state. The controller is also configured to incrementally ramp up a speed of the motor from the no-load speed to a selected speed when the power tool is in the loaded state and incrementally ramp down the speed of the motor from the selected speed to the no-load speed when the power tool is in the unloaded state.

Another embodiment provides a power tool including a tool output, a motor driving the tool output, a battery pack interface, a power switching network coupled between the battery pack interface and the motor, a current sensor, and a controller coupled to the current sensor and the power switching network to control operation of the motor. The controller is configured to measure, using the current sensor, a first current and a second current. The controller is also configured to determine a difference between the first current and the second current and determine whether the difference between the first current and the second current exceeds a predetermined divergence threshold. The controller is further configured to determine that the power tool is in a loaded state when the difference between the first current and the second current exceeds the predetermined divergence threshold and determine whether the second current exceeds a predetermined load current threshold when the difference between the first current and the second current does not exceed the predetermined divergence threshold. The controller is also configured to determine that the power tool is in the loaded state when the second current exceeds the predetermined load current threshold and determine that the power tool is in the unloaded state when the second current does not exceed the predetermined load current threshold.

Another embodiment provides a method for operating a power tool based on a load state of the power tool. The method includes operating, using a controller and power switching network of the power tool, the motor at a no-load speed at startup and detecting, using the controller, the load state of the power tool. The load state indicates whether the power tool is in a loaded state or an unloaded state. The method also includes incrementally ramping up, using the controller, a speed of the motor from the no-load speed to a selected speed when the power tool is in the loaded state and incrementally ramping down, using the controller, the speed of the motor from the selected speed to the no-load speed when the power tool is in the unloaded state.

Another embodiment provides a method for detecting a load state of a power tool. The method includes measuring, using a current sensor of the power tool, a first current and a second current. The method also includes determining, using a controller of the power tool, a difference between the first current and the second current and determining, using the controller, whether the difference between the first current and the second current exceeds a predetermined divergence threshold. The method further includes determining, using the controller, that the power tool is in a loaded state when the difference between the first current and the second current exceeds the predetermined divergence threshold and determining, using the controller, whether the second current exceeds a predetermined load current threshold when the difference between the first current and the second current does not exceed the predetermined divergence threshold. The method also includes determining, using the controller, that the power tool is in the loaded state when the second current exceeds the predetermined load current threshold and determining, using the controller, that the power tool is in the unloaded state when the second current does not exceed the predetermined load current threshold.

Before any embodiments are explained in detail, it is to be understood that the embodiments are not limited in its application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers," "computing devices," "controllers," "processors," etc., described in the specification can include one or more processing units, one or more computer-readable medium modules, one or more input/output interfaces, and various connections (e.g., a system bus) connecting the components.

Relative terminology, such as, for example, "about," "approximately," "substantially," etc., used in connection with a quantity or condition would be understood by those of ordinary skill to be inclusive of the stated value and has the meaning dictated by the context (e.g., the term includes at least the degree of error associated with the measurement accuracy, tolerances [e.g., manufacturing, assembly, use, etc.] associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10%, or more) of an indicated value.

It should be understood that although certain drawings illustrate hardware and software located within particular devices, these depictions are for illustrative purposes only. Functionality described herein as being performed by one component may be performed by multiple components in a distributed manner. Likewise, functionality performed by multiple components may be consolidated and performed by a single component. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links. Similarly, a component described as performing particular functionality may also perform additional functionality not described herein. For example, a device or structure that is "configured" in a certain way is configured in at least that way but may also be configured in ways that are not explicitly listed.

Other aspects of the embodiments will become apparent by consideration of the detailed description and accompanying drawings.

DETAILED DESCRIPTION

Figure 1:
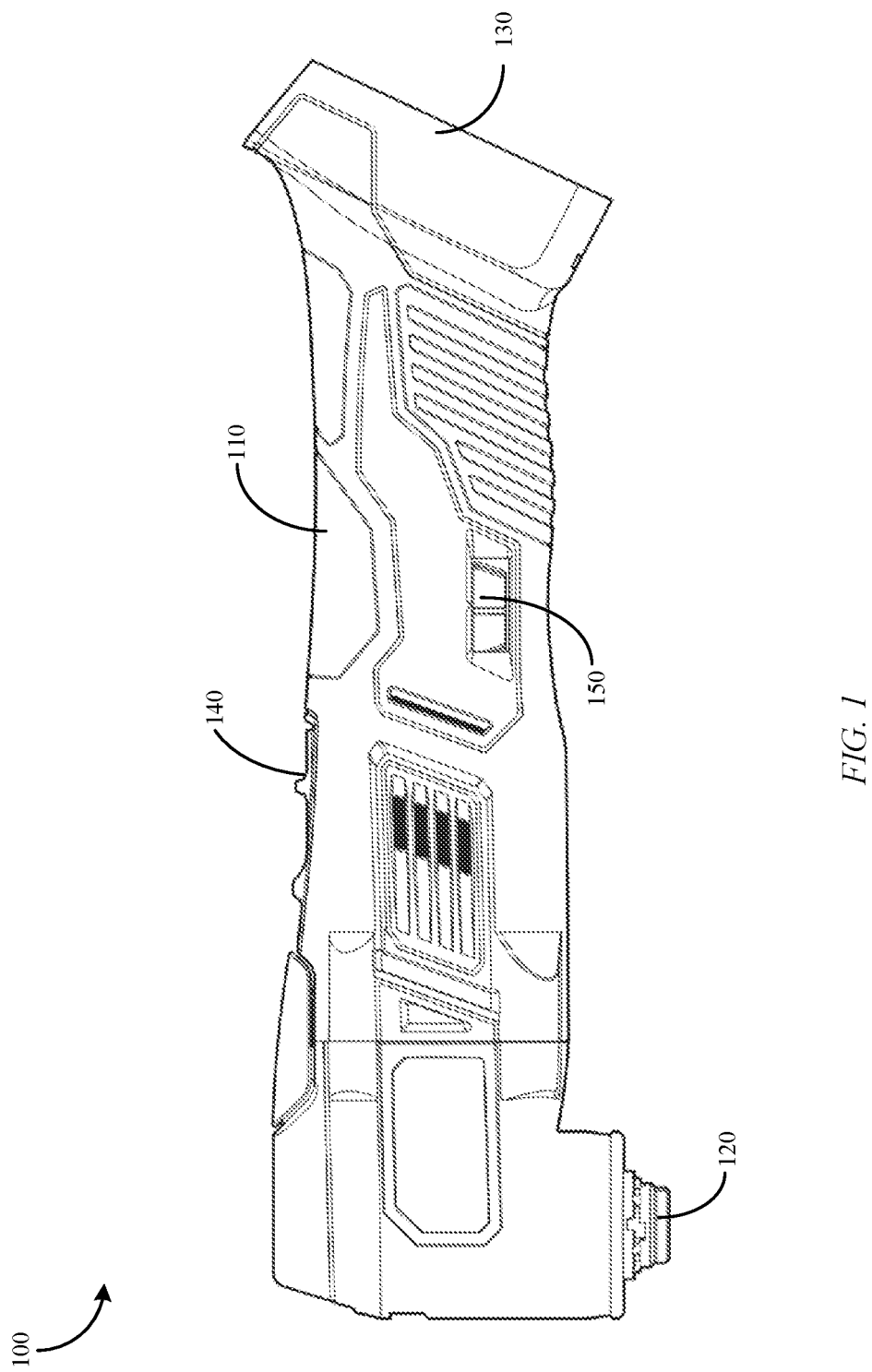
FIG. 1 is a perspective view of a power tool in accordance with some embodiments.

FIG. 1 illustrates a perspective view of an example power tool 100. In the example illustrated, the power tool 100 is a multi-tool. However, the present disclosure is equally applicable for other motorized power tools, for example, saws (jigsaw, reciprocating saw, miter saw, and the like), grinders (angle grinder, disc grinder, and the like), driver/drills (hammer drill, impact driver, and the like), and the like. The power tool 100 includes a housing 110 supporting a tool output, such as a tool bit 120 operated by a motor 220 (shown in FIG. 2). The power tool 100 includes a battery pack interface 130 to removably receives a battery pack 270 (shown in FIG. 2). The battery pack 270 provides operating power to the power tool 100. The battery pack 270 is, for example, an 18 Volt (V) Lithium-ion battery pack. In other embodiments, the battery pack 270 may have different nominal voltages (for example, 12 V, 36 V, and the like) and have different battery chemistries (for example, Nickel-Cadmium, and the like).

The power tool 100 also includes a switch trigger 140 and a speed switch or dial 150. In the example illustrated, the switch trigger 140 is a two-position switch provided on the housing 110 and is internally connected to an on/off switch. In a first position, the switch trigger 140 turns off the power tool 100 such that power from the battery pack 270 is disconnected. In a second position, the switch trigger 140 turns on the power tool 100 such that power from the battery pack 270 is provided to the motor 220 of the power tool 100. The speed dial 150 is a rotatable dial provided on the housing 110. The speed dial 150 can be rotated to select a speed setting of the power tool 100. The speed dial 150 may include a plurality of settings each corresponding to a different operating speed. One of the plurality of settings may correspond to an "automatic mode" that results in the control techniques as described below. In some embodiments, the speed ramping techniques described herein are implemented for any speed setting selected using the speed dial 150. In other embodiments, the speed ramping techniques described herein are implemented for a subset of the speed settings (e.g., for the automatic mode setting) that can be selected using the speed dial 150. In some embodiments, the switch trigger 140 is a variable speed trigger such that the switch trigger 140 is used for both turning on the power tool 100 and selecting an operation speed of the power tool 100.

Figure 2:
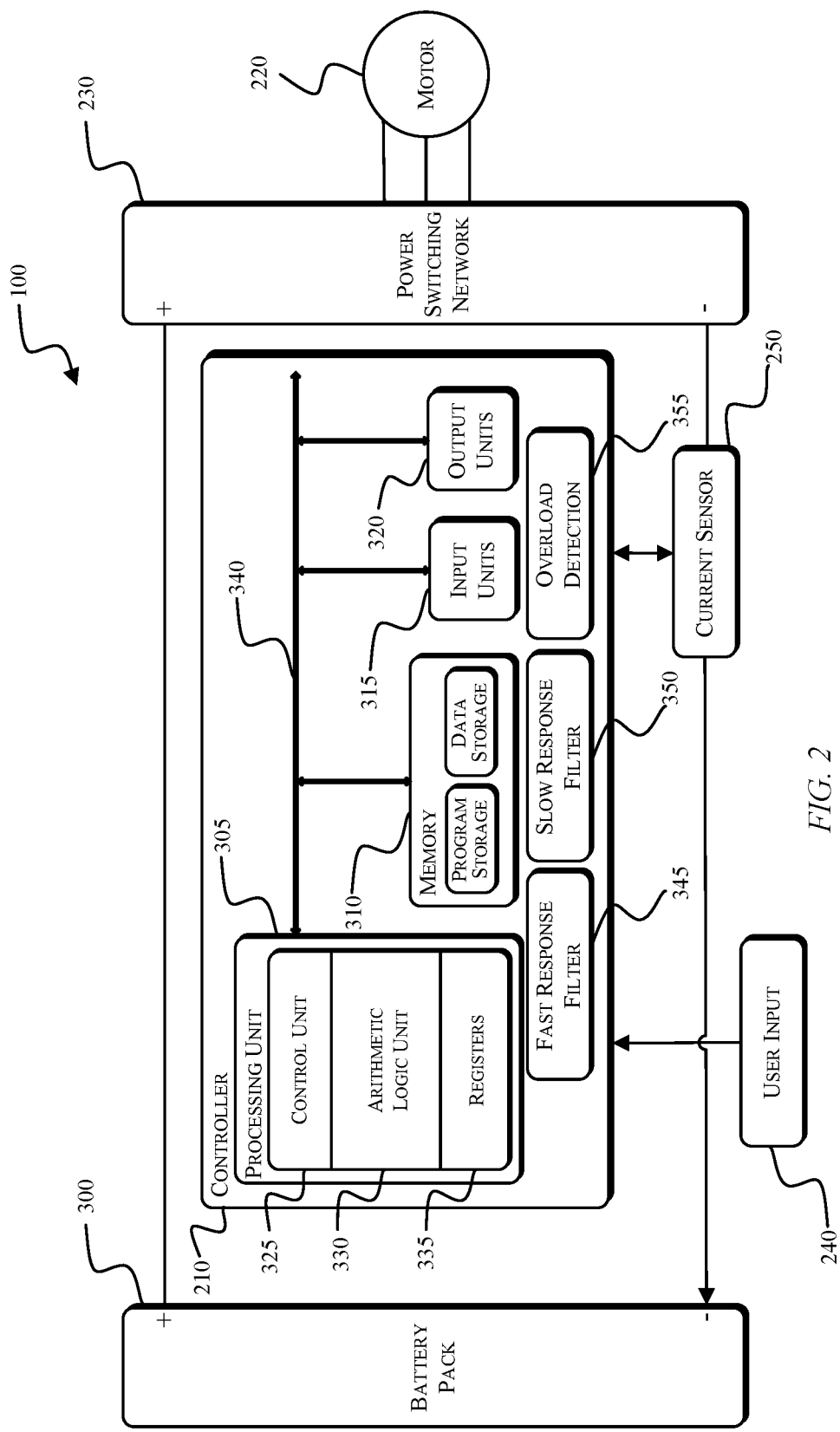
FIG. 2 is a block diagram of the power tool of FIG. 1 in accordance with some embodiments.

FIG. 2 is a simplified block diagram of the power tool 100. In the example illustrated, the power tool 100 includes a controller 210, a motor 220, a power switching network 230, a user input 240, a current sensor 250, and the battery pack 270.

The controller 210 includes a plurality of electrical and electronic components that provide power, operational control, and protection to the components and modules within the controller 210 and/or the power tool 100. For example, the controller 210 includes, among other things, a processing unit 305 (e.g., a microprocessor, a microcontroller, an electronic processor, an electronic controller, or another suitable programmable device), a memory 310, input units 315, and output units 320. The processing unit 305 includes, among other things, a control unit 325, an ALU 330, and a plurality of registers 335 (shown as a group of registers in FIG. 2), and is implemented using a known computer architecture (e.g., a modified Harvard architecture, a von Neumann architecture, etc.). The processing unit 305, the memory 310, the input units 315, and the output units 320, as well as the various modules or circuits connected to the controller 210 are connected by one or more control and/or data buses (e.g., common bus 340). The control and/or data buses are shown generally in FIG. 2 for illustrative purposes. The use of one or more control and/or data buses for the interconnection between and communication among the various modules, circuits, and components would be known to a person skilled in the art in view of the embodiments described herein. In some embodiments, the controller 210 is implemented partially or entirely on a field-programmable gate array (FPGA), an application specific integrated circuit (ASIC), or the like.

The memory 310 is a non-transitory computer readable medium and includes, for example, a program storage area and a data storage area. The program storage area and the data storage area can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The processing unit 305 is connected to the memory 310 and executes software instructions that are capable of being stored in a RAM of the memory 310 (e.g., during execution), a ROM of the memory 310 (e.g., on a generally permanent basis), or another non-transitory computer readable medium such as another memory or a disc. Software included in the implementation of the power tool 100 can be stored in the memory 310 of the controller 210. The software includes, for example, firmware, one or more applications, program data, filters, rules, one or more program modules, and other executable instructions. The controller 210 is configured to retrieve from the memory 310 and execute, among other things, instructions related to the control processes and methods described herein. In other constructions, the controller 210 includes additional, fewer, or different components.

In the example illustrated, the motor 220 is a brushless direct current (BLDC) motor. In some embodiments, the motor 220 may be an AC motor, a DC motor, a switched reluctance motor, and the like. In some embodiments, a position sensor (for example, a Hall sensor, back-EMF detector) is provided with the motor 220. The position sensor outputs motor feedback information, such as an indication (e.g., a pulse) when a magnet of the rotor rotates across the face of the position sensor. Based on the motor feedback information from the position sensor, the controller 210 can determine the position, velocity, and acceleration of the motor 220. The controller 210 also receives user controls from the user input 240, for example, from the speed dial 150. In response to the motor feedback information and the user controls, the controller 210 transmits control signals to the power switching network 230 to drive the motor 220.

The power switching network 230 is implemented as an inverter bridge. The power switching network 230 includes a plurality of high-side power switching elements (for example, field effect transistors [FETs]) and a plurality of low side power switching elements. The controller 210 provides control signals to control the high-side FETs and the low side FETs to drive the motor 220 based on the motor feedback information and user controls, as noted above. To drive the motor 220, the controller 210 enables a first high side FET and first low side FET pair (e.g., by providing a voltage at a gate terminal of the FETs) connected to different phase terminals of the motor 220 for a first period of time. In response to determining that the rotor of the motor 220 has rotated based on a pulse from the position sensor, the controller 210 disables the first FET pair, and enables a second FET pair. In response to determining that the rotor of the motor 220 has rotated based on pulse(s) from the position sensor, the controller 210 disables the second FET pair, and enables a third FET pair. In response to determining that the rotor of the motor 220 has rotated based on further pulse(s) from the position sensor, the controller 210 disables the third FET pair and returns to enable the first FET pair. This sequence of cyclically enabling FET pairs repeats to drive the motor 220. Further, in some embodiments, the control signals include pulse width modulated (PWM) signals having a duty cycle that is set in proportion to the speed setting selected by the speed dial 150, to thereby control the speed or torque of the motor 220. In some embodiments, the power switching network 230 includes a triac (for example, when the motor 220 is an AC motor), a single FET (for example, when the motor 220 is a DC motor), or the like. In these embodiments, the controller 210 controls the power switching network 230 based on user controls to control the speed or torque of the motor 220.

The user input 240 includes, for example, the switch trigger 140 and the speed dial 150. In some embodiments, the user input 240 may also include a forward/reverse switch, a transceiver to receive inputs from a connected smart telephone application, and the like.

The current sensor 250 is provided on a current path between the battery pack 270 and the motor 220. In the example illustrated, the current sensor 250 is provided between the negative terminal of the battery pack 270 and the negative terminal of the power switching network 230. In some embodiments, the current sensor 250 is provided between the positive terminal of the battery pack 270 and the positive terminal of the power switching network 230. In other embodiments, the current sensor 250 is coupled to the motor phase coils.

The controller 210 includes a fast response filter 345, a slow response filter 350, and an overload detector 355. Although the fast response filter 345, the slow response filter 350, and the overload detector 355 are illustrated as separate modules, these modulates may be within the program storage area of the memory 310. In some embodiments, the fast response filter 345, the slow response filter 350, and the overload detector 355 may be implemented in hardware using filter and comparator components. The current sensor 250 provided on the current path provides current signals to the fast response filter 345, the slow response filter 350, and the overload detector 355 in the controller 210. The current sensor 250 and the fast response filter 345 are together referred to as a first current sensor, the current sensor 250 and the slow response filter 350 are together referred to as a second current sensor, and the current sensor 250 and the overload detector 355 are together referred to as a third current sensor.

The fast response filter averages the current passing through the current sensor 250 over a shorter period of time compared to the slow response filter 350. For example, the current sensor 250 averages the current over 50 ms. In some embodiments, the first current sensor averages the current over a time period between 1 ms and 100 ms. The fast response filter 345 provides an indication of the fast response current to the controller 210. The slow response filter 350 averages the current passing through the current sensor 250 over a longer period of time compared to the fast response filter 345. For example, the second current sensor averages the current over 250 ms. In some embodiments, the second current sensor averages the current over a time period between 200 ms and 300 ms. The slow response filter 350 provides an indication of the slow response current to the controller 210.

During operation, the speed of the power tool 100 is controlled to provide the appropriate amount of power for working on a work piece. The power tool 100 includes two load states: (i) a loaded state; and (ii) an unloaded state. In the loaded state, the tool bit 120 is in contact with the workpiece and is performing work on the workpiece (for example, sawing through a material, driving a fastener, scraping a workpiece, and the like). In the unloaded state, the tool bit 120 is not in contact with the workpiece. In the loaded state, higher speeds are generally desired for optimum power delivery to the tool bit 120. In contrast, in the unloaded state, higher speeds will result in excess battery drain and excess noise. The controller 210 performs load based speed control to prevent excess battery drain and excess noise. Specifically, the controller 210 increases the speed of the power tool 100 to correspond to the selected speed and decreases the speed of the power tool 100 to a predetermined no-load speed.

In some instances, based on the selected output speed, the difference between no-load speed and selected speed may be large. Sudden increases or decreases between the no-load speed and selected speed may negatively affect a user's experience. To improve the user experience, the controller 210 may gradually (e.g., incrementally) ramp up from the no-load speed to the selected speed and gradually (e.g., incrementally) ramp down from the selected speed to the no-load speed. In one example, for incremental ramp up, the controller 210 may increase the PWM duty ratio by 2% every 1 milli-second. Similarly, for incremental ramp down, the controller 210 may decrease the PWM duty ratio by 2% every 1 milli-second. The ramp up and ramp down profiles may be preprogrammed into the controller 210. The ramp up and ramp down of speed may be linear, however, the ramp up profile and the ramp down profile need not be linear between the starting and ending points.

Figure 3:
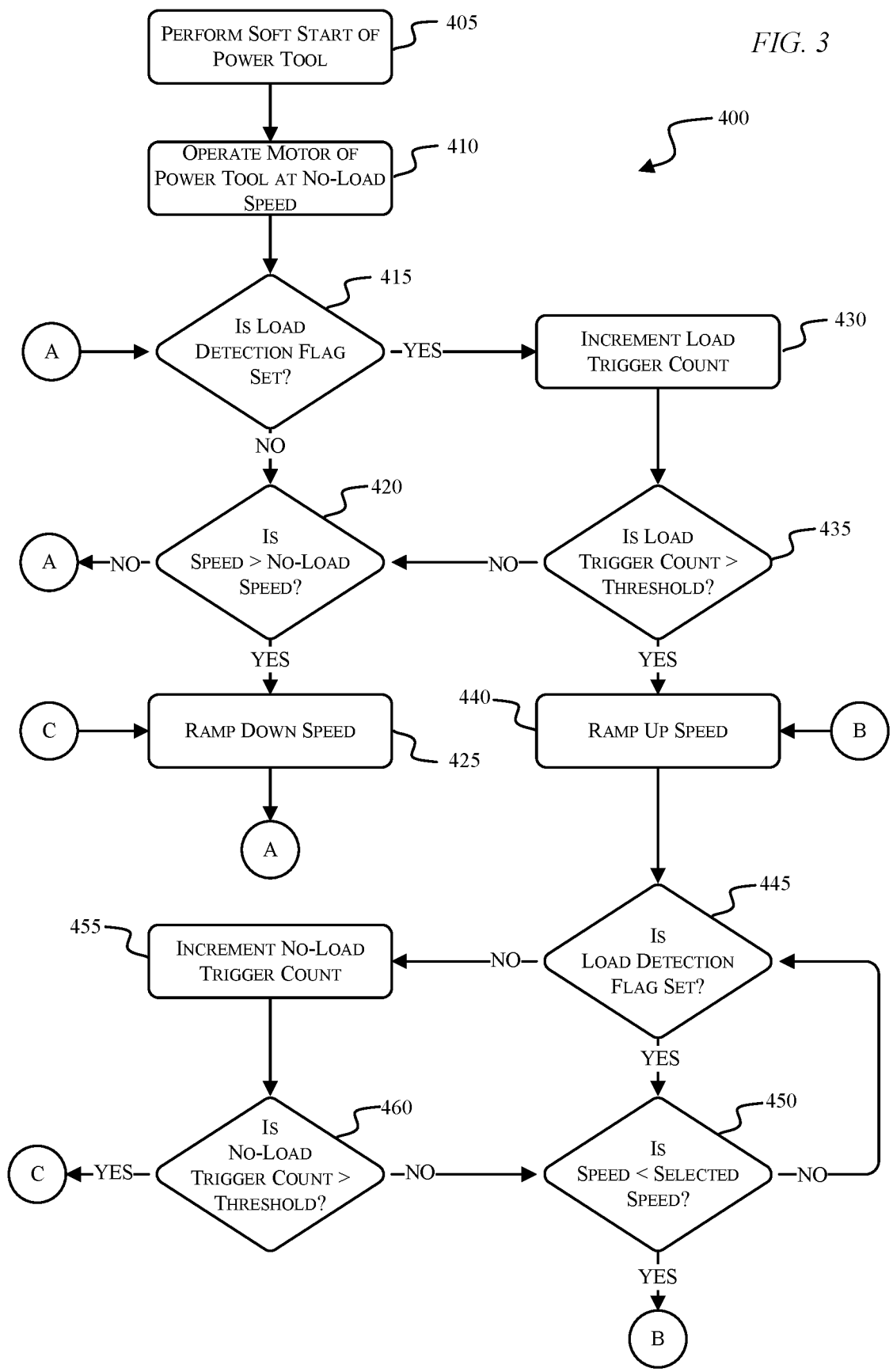
FIG. 3 is a flowchart of a method for automatically ramping the speed of the power tool of FIG. 1 in accordance with some embodiments.

FIG. 3 is a flowchart of an example method 400 for automatically ramping the speed of the power tool 100. The method 400 includes performing, using the controller 210, a soft start of the power tool 100 (at block 405). During startup, large amounts of in-rush current may flow to the power tool 100 from the battery pack 270, which may damage the electrical components of the power tool 100. To prevent in-rush current, the power tool 100 is operated at low speeds during startup. The controller 210 controls the PWM duty cycle to perform the soft start.

The method 400 includes operating, using the controller 210, the motor 220 of the power tool 100 at a no-load speed at startup (at block 410). After the soft start is complete, the controller 210 may ramp up the speed to the no-load speed. The no-load speed is, for example, a default speed (e.g., 15,000 rpm) pre-programmed into the controller 210. The method 400 includes determining, using the controller 210, whether a load detection flag is set (at block 415). The controller 210 determines a load state of the motor 220 based on the current detected by the controller 210 as further described below with respect to method 500 (shown in FIG. 4). The controller 210 sets the load detection flag when the controller 210 determines that the power tool 100 is in the loaded state. In some embodiments, the controller 210 may wait until the no-load speed is stable before determining whether the load detection flag is set.

When the load detection flag is not set, the method 400 includes determining, using the controller 210, whether the speed of the motor 220 is above the no-load speed (at block 420). For example, the controller 210 may detect the speed of the motor 220 using the position sensor. When the speed of the motor 220 is not above the no-load speed, the method 400 returns to block 415. When the speed of the motor 220 is above the no-load speed, the method 400 includes ramping down, using the controller 210, the speed of the motor 220 (at block 425). The controller 210 reduces the PWM duty cycle to decrease the speed of the motor 220. For example, the controller 210 reduces the PWM duty cycle by 2%. The method 400 then returns to block 415.

When the load state detection flag is set, the method 400 includes incrementing, using the controller 210, a load trigger count (at block 430). In some embodiments, the controller 210 may wait until the load state is stably detected before increasing the speed of the motor 220. The controller 210 implements a counter, that is, the load trigger count to accumulate the time for which the power tool 100 is loaded. The method 400 includes determining, using the controller 210, whether the load trigger count exceeds a predetermined load trigger count threshold (at block 435). The predetermined load trigger count threshold may be set during manufacture based on simulation data. In one example, the predetermined load trigger count threshold is set to 4. When the load trigger count does not exceed the predetermined load trigger count threshold, the method 400 returns to block 420.

When the load trigger count exceeds the predetermine load trigger count threshold, the method 400 includes ramping up, using the controller 210, the speed of the motor 220 (at block 440). The controller 210 increases the PWM duty cycle to increase the speed of the motor 220 (e.g., to 20,000 rpm). For example, the controller 210 increases the PWM duty cycle by 2%. The method 400 includes determining, using the controller 210, whether the load state detection flag is set (at block 445). When the load state detection flag is set, the method 400 determines, using the controller 210, whether the speed of the motor 220 is below the selected speed (at block 450). When the speed of the motor 220 is not below the selected speed, the method 400 returns to block 445. When the speed of the motor 220 is below the selected speed, the method 400 returns to block 440.

When the load state detection flag is not set, the method 400 includes incrementing, using the controller 210, a no-load trigger count (at block 455). In some embodiments, the controller 210 may wait until the no-load state is stably detected before decreasing the speed of the motor 220. The controller 210 implements a counter, that is, the no-load trigger count to accumulate the time for which the power tool 100 is loaded. The method 400 includes determining, using the controller 210, whether the no-load trigger count exceeds a predetermined no-load trigger count threshold (at block 460). The predetermined no-load trigger count threshold may be set during manufacture based on simulation data. The predetermined no-load trigger count threshold may generally set to be larger than the predetermined load trigger count threshold. In on example, the predetermined load trigger count threshold is set to 9. When the no-load trigger count does not exceed the predetermined no-load trigger count threshold, the method 400 returns to block 450. When the no-load trigger count exceeds the predetermined no-load trigger count, the method 400 returns to block 425. The method 400 repeats until the power tool 100 is turned off.

A power tool 100, for example, a multi-tool may be used to perform work on several workpieces. Typically, a user does not turn the power tool 100 off before switching from a first workpiece to a second workpiece. This results in the power tool 100 running at a high speed while idling (e.g., corresponding to particular maximum speed setting). The method 400 detects this idling mode (i.e., the unloaded state) and reduces the motor speed to the no-load speed and thereby providing battery power savings and also preventing overheating of the power tool 100. In some embodiments, the method 400 may be implemented only in a selected "automatic mode." For example, the power tool 100 includes an "Auto" or "A" speed setting (e.g., separate from particular maximum speed settings such 1-10). When the power tool is set to the automatic mode, the method 400 detects idling (i.e., the unloaded state) and reduces the motor speed to the no-load speed.

Figure 4:
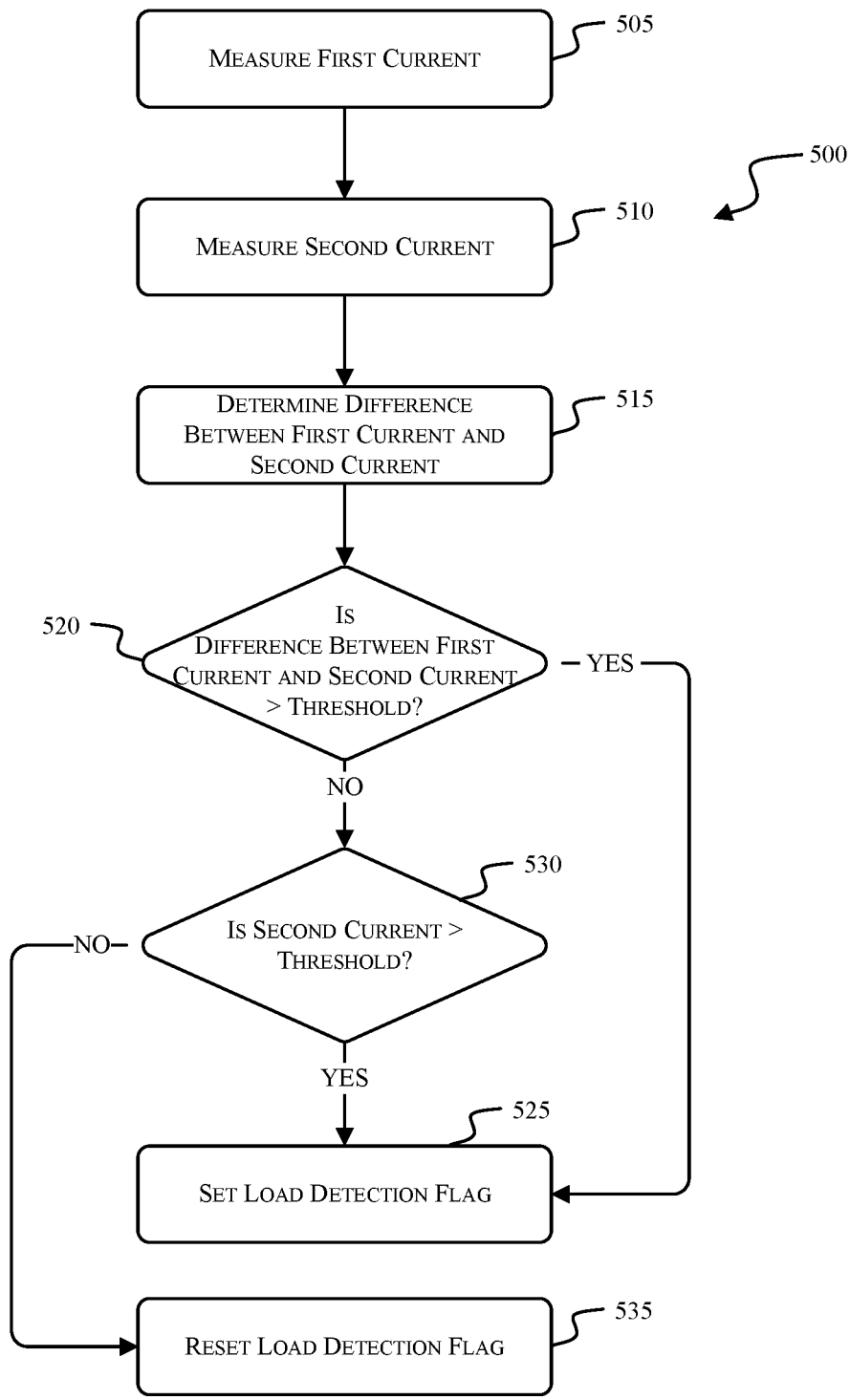
FIG. 4 is a flowchart of a method for detecting load on the power tool of FIG. 1 in accordance with some embodiments.

FIG. 4 is a flowchart of an example method 500 for detecting a load state of the power tool 100. In the example illustrated, the method 500 includes measuring, using the first current sensor, a first current (at block 505). As discussed above, the first current sensor provides a first indication of the current flowing through the motor 220. Specifically, the first current sensor provides the first indication of the value of current averaged over a shorter period of time. The method 500 also includes measuring, using the second current sensor, a second current (at block 510). As discussed above, the second current sensor 260 provides a second indication of the current flowing through the motor 220. Specifically, the second current sensor 260 provides a second indication of the value of current averaged over a longer period of time.

The method 500 includes determining, using the controller 210, a difference between the first current and the second current (at block 515). In some embodiments, the controller 210 subtracts the second current from the first current. The method 500 includes determining, using the controller 210, whether the difference between the first current and the second current exceeds a predetermined divergence threshold (at block 520). The controller 210 compares the difference between the first current and the second current to the predetermined divergence threshold.

When the difference between the first current and the second current exceeds the predetermined divergence threshold, the method 500 includes setting, using the controller 210, the load detection flag (for example, Load_Detection_Flag==1) (at block 525). In some embodiments, the method 400 and the method 500 are implemented as parallel processes by the controller 210. When the controller 210 sets the load detection flag in method 500, the load state detection value is updated in the method 400 using, for example, an interrupt or an input.

When the difference between the first current and the second current does not exceed the predetermined divergence threshold, the method 500 includes determining, using the controller 210, whether the second current exceeds a predetermined load current threshold (at block 530). The controller 210 compares the second current to the predetermined load current threshold. When the second current exceeds the predetermined load current threshold, the method 500 proceeds to block 525. When the second current does not exceed the predetermined load current threshold, the method 500 includes resetting, using the controller 210, the load detection flag (for example, Load_Detection_Flag==0) (at block 535). Resetting the load detection flag is equivalent to not setting the load detection flag. At startup, the load detection flag may be reset to 0. The method 500 repeats continuously during the operation of the power tool 100 to determine the load state of the power tool 100. The method 500 allows the controller 210 to accurately detect a load state of the power tool 100.

Thus, embodiments described herein provide, among other things, automatic ramp load sense for power tools.

What is claimed is:

1. A power tool comprising:
   a tool output;
   a motor configured to drive the tool output;
   a power switching network coupled between a battery pack interface and the motor; and
   a controller connected to the power switching network to control operation of the motor, the controller configured to:
   operate the motor at a no-load speed at startup,
   detect a load state of the power tool, the load state indicating whether the power tool is in a loaded state or an unloaded state,
   determine a first indication of current on a current path between the battery pack interface and the motor and a second indication of current on the current path,
   determine a difference between the first indication of current and the second indication of current,
   determine whether the difference between the first indication of current and the second indication of current exceeds a predetermined divergence threshold,
   determine that the power tool is in the loaded state when the difference between the first indication of current and the second indication of current exceeds the predetermined divergence threshold,
   incrementally ramp up a speed of the motor from the no-load speed to a selected speed when the power tool is in the loaded state, and
   incrementally ramp down the speed of the motor from the selected speed to the no-load speed when the power tool is in the unloaded state.

2. The power tool of claim 1, further comprising:
   a speed switch configured to be moved between a plurality of positions corresponding to a plurality of settings each corresponding to a different operating speed, the selected speed selected using the speed switch, wherein one of the plurality of settings corresponds to an automatic mode; and
   a switch trigger configured to turn the power tool on and off,
   wherein the controller is further configured to:
   operate the motor at the selected speed at startup when the automatic mode is not selected by the speed switch.

3. The power tool of claim 1, wherein the controller is further configured to:
   wherein, when the difference between the first indication of current and the second indication of current does not exceed the predetermined divergence threshold,
   determine whether the second indication of current exceeds a predetermined load current threshold,
   determine that the power tool is in the loaded state when the second indication of current exceeds the predetermined load current threshold, and
   determine that the power tool is in the unloaded state when the second indication of current does not exceed the predetermined load current threshold.

4. The power tool of claim 1, further comprising:
   a fast response filter configured to output the first indication of current by averaging a current passing through the current path over a first period of time; and
   a slow response filter configured to output the second indication of current by averaging the current passing through the current path over a second period of time longer than the first period of time.

5. The power tool of claim 4, wherein the fast response filter and the slow response filter are implemented using hardware components.

6. The power tool of claim 4, wherein the fast response filter and the slow response filter are implemented as software within the controller.

7. The power tool of claim 1, wherein the controller is further configured to perform a soft start at startup.

8. The power tool of claim 1, wherein the controller is configured to:
   increase a pulse-width modulated duty ratio of control signals provided to the power switching network by 2% every 1 milli-second to incrementally ramp up the speed; and
   decrease the pulse-width modulated duty ratio of the control signals by 2% every 1 milli-second to incrementally ramp down the speed.

9. A power tool comprising:
a power switching network coupled between a battery pack interface and the motor; and
a controller coupled to the power switching network to control operation of the motor, the controller configured to:
determine a first indication of current on a current path between the battery pack interface and the motor and a second indication of current on the current path,
determine a difference between the first indication of current and the second indication of current,
determine whether the difference between the first indication of current and the second indication of current exceeds a predetermined divergence threshold,
determine that the power tool is in a loaded state when the difference between the first indication of current and the second indication of current exceeds the predetermined divergence threshold,
wherein, when the difference between the first indication of current and the second indication of current does not exceed the predetermined divergence threshold,
determine whether the second indication of current exceeds a predetermined load current threshold,
determine that the power tool is in the loaded state when the second indication of current exceeds the predetermined load current threshold, and
determine that the power tool is in an unloaded state when the second indication of current does not exceed the predetermined load current threshold.

10. The power tool of claim 9, further comprising:
a fast response filter configured to output the first indication of current by averaging a current passing through the current path over a first period of time; and
a slow response filter configured to output the second indication of current by averaging the current passing through the current path over a second period of time longer than the first period of time.

11. The power tool of claim 10, wherein the fast response filter and the slow response filter are implemented using hardware components.

12. The power tool of claim 10, wherein the fast response filter and the slow response filter are implemented as software within the controller.

13. The power tool of claim 10, wherein the controller is further configured to:
operate the motor at a no-load speed at startup,
detect a load state of the power tool, the load state indicating whether the power tool is in the loaded state or the unloaded state,
incrementally ramp up a speed of the motor from the no-load speed to a selected speed when the power tool is in the loaded state, and
incrementally ramp down the speed of the motor from the selected speed to the no-load speed when the power tool is in the unloaded state.

14. The power tool of claim 13, wherein the controller is further configured to perform a soft start at startup.

15. The power tool of claim 14, further comprising:
a speed switch configured to be moved between a plurality of positions corresponding to a plurality of settings each corresponding to a different operating speed, the selected speed selected using the speed switch, wherein one of the plurality of settings corresponds to an automatic mode; and
a switch trigger configured to turn the power tool on and off,
wherein the controller is further configured to:
operate the motor at the selected speed at startup when the automatic mode is not selected by the speed switch.

16. A method for operating a power tool based on a load state of the power tool, the method comprising:
operating, using a controller and a power switching network of the power tool, a motor of the power tool at a no-load speed at startup;
detecting, using the controller, the load state of the power tool, the load state indicating whether the power tool is in a loaded state or an unloaded state;
determining, using the controller, a first indication of current on a current path between the battery pack interface and the motor and a second indication of current on the current path a first current and a second current;
determining, using the controller, a difference between the first indication of current and the second indication of current;
determining, using the controller, whether the difference between the first indication of current and the second indication of current exceeds a predetermined divergence threshold;
determining, using the controller, that the power tool is in the loaded state when the difference between the first indication of current and the second indication of current exceeds the predetermined divergence threshold;
incrementally ramping up, using the controller, a speed of the motor from the no-load speed to a selected speed when the power tool is in the loaded state; and
incrementally ramping down, using the controller, the speed of the motor from the selected speed to the no-load speed when the power tool is in the unloaded state.

17. The method of claim 16, further comprising:
determining whether an automatic mode is selected; and
operating the motor at the selected speed at startup when the automatic mode is not selected.

18. The method of claim 16, further comprising:
wherein, when the difference between the first indication of current and the second indication of current does not exceed the predetermined divergence threshold:
determining, using the controller, whether the second indication of current exceeds a predetermined load current threshold;
determining, using the controller, that the power tool is in the loaded state when the second indication of current exceeds the predetermined load current threshold; and
determining, using the controller, that the power tool is in the unloaded state when the second indication of current does not exceed the predetermined load current threshold.

19. The method of claim 18, further comprising:
averaging, using a fast response filter, a current passing through the current path over a first period of time to determine the first indication of current; and
averaging, using a slow response filter, the current over a second period of time to determine the second indication of current, the second period of time being longer than the first period of time.

20. The method of claim 16, further comprising performing a soft start at startup.

\* \* \* \* \*